(12) United States Patent
Gluck et al.

(10) Patent No.: US 7,512,540 B2
(45) Date of Patent: Mar. 31, 2009

(54) AUTOMATED NEW ENERGY TECHNOLOGY CONSULTING AND DEMAND AGGREGATION SYSTEM AND METHOD

(76) Inventors: Daniel S. Gluck, 839 West End Ave., #6F, New York, NY (US) 10025; Ronald Kamen, 11 Sturges St., Binghamton, NY (US) 13901

( * ) Notice: Subject to any disclaimer, the term of this patent is extended or adjusted under 35 U.S.C. 154(b) by 0 days.

(21) Appl. No.: 09/965,597

(22) Filed: Sep. 26, 2001

(65) Prior Publication Data
US 2002/0040356 A1 Apr. 4, 2002

Related U.S. Application Data

(60) Provisional application No. 60/235,492, filed on Sep. 26, 2000.

(51) Int. Cl.
*G06Q 10/00* (2006.01)
*G06F 17/00* (2006.01)
(52) U.S. Cl. .......................... 705/1; 705/412
(58) Field of Classification Search .............. 705/1, 705/51, 52, 53, 63, 7, 8, 9, 10, 11, 26, 27, 705/35, 412, 413, 400, 37, 28, 29, 80, 14, 705/500; 700/286, 291
See application file for complete search history.

(56) References Cited

U.S. PATENT DOCUMENTS

| | | | |
|---|---|---|---|
| 3,683,161 A * | 8/1972 | Stadlin et al. | 235/151.21 |
| 3,913,829 A * | 10/1975 | Fink | 235/151.21 |
| 4,992,940 A * | 2/1991 | Dworkin | 705/26 |
| 5,237,507 A * | 8/1993 | Chasek | 705/412 |
| 5,432,710 A * | 7/1995 | Ishimaru et al. | 705/412 |
| 5,621,654 A | 4/1997 | Cohen et al. | |
| 5,758,331 A * | 5/1998 | Johnson | 705/412 |

(Continued)

FOREIGN PATENT DOCUMENTS

| GB | 2152248 A | * | 7/1985 |
|---|---|---|---|
| WO | WO 99/45445 | * | 10/1999 |

OTHER PUBLICATIONS

"An emperical analysis of the housing decisions of older homeowners". Dialog, File 148.*

(Continued)

*Primary Examiner*—Igor N Borissov
(74) *Attorney, Agent, or Firm*—Otho B. Ross

(57) ABSTRACT

An automated energy consulting system and method is provided comprising an interactive input system linked to calculation algorithms and databases of energy-related products and services, affiliated service providers, and climate, financing and regulatory criteria. The system generates proposals of available energy-related products, services and financing options, and obtains and aggregates customer commitments to allow discounted purchasing of the components. Customers can earn referral commissions to encourage customers and volunteers to virally disseminate the access information. For customers not eligible for beneficial products and services because of regulatory deficiencies, the system automates the customer education process to encourage them to advocate politically for the changes that will make them eligible. The automation of the energy consulting and marketing process, mass customization, demand aggregation, and viral marketing reduce customer acquisition and component purchasing costs and reduce the price to consumers, creating new economically viable markets for environmentally friendly energy-related products and services.

10 Claims, 1 Drawing Sheet

U.S. PATENT DOCUMENTS

| | | | |
|---|---|---|---|
| 5,794,212 A | 8/1998 | Mistr, Jr. | |
| 5,924,486 A * | 7/1999 | Ehlers et al. | 705/412 |
| 5,930,773 A | 7/1999 | Crooks et al. | |
| 6,029,141 A * | 2/2000 | Bezos et al. | 705/27 |
| 6,047,274 A | 4/2000 | Johnson et al. | |
| 6,088,688 A | 7/2000 | Crooks et al. | |
| 6,151,330 A | 11/2000 | Liberman | |
| 6,169,979 B1 | 1/2001 | Johnson | |
| 6,260,024 B1 * | 7/2001 | Shkedy | 705/37 |
| 6,269,343 B1 | 7/2001 | Pallakof | |
| 6,311,105 B1 * | 10/2001 | Budike, Jr. | 700/291 |
| 6,338,050 B1 * | 1/2002 | Conklin et al. | 705/80 |
| 6,396,839 B1 * | 5/2002 | Ardalan et al. | 370/401 |
| 6,466,919 B1 * | 10/2002 | Walker et al. | 705/37 |
| 6,553,418 B1 * | 4/2003 | Collins et al. | 709/224 |
| 6,697,951 B1 * | 2/2004 | Sinha et al. | 713/300 |
| 6,785,592 B1 * | 8/2004 | Smith et al. | 700/291 |
| 2002/0120540 A1 * | 8/2002 | Kende et al. | 705/35 |
| 2003/0139996 A1 * | 7/2003 | D'Antoni et al. | 705/37 |

OTHER PUBLICATIONS

"Updated 'Green Schools' site brings energy issues to entire school"; Jul. 1999; Building Operating Management; Vo. 46. Iss. 7; pg.*
Achon; "Building an international plastics base in Spain"; Apr. 1996; Chemical Week; p. S23, 2pgs.*
"Active Music"; Internet print -out; 25 years of non-profit organizsation; 5 pgs.*
[See Attached International Search Report, Dated Sep. 17, 2002, for PCT/US01/30173, Citing 5 US Patents and 1 Publication, All Coded "A"].

* cited by examiner

AUTOMATED NEW ENERGY TECHNOLOGY CONSULTING AND DEMAND AGGREGATION SYSTEM AND METHOD

CROSS REFERENCE TO PROVISIONAL APPLICATION

Reference is made to prior provisional application Ser. No. 60/235,492, filed Sep. 26, 2000 by the inventors of the present invention. Such application is incorporated herein by reference.

BACKGROUND OF THE INVENTION

Traditional forms of producing energy, such as using nuclear reactors or burning fossil fuels, have many harmful side effects, including radioactive waste, air pollution, acid rain, and global warming. As a result, there has been the beginning of a strong movement in recent years towards cleaner energy sources like sunlight, wind and hydrogen-based chemical reactions.

Sunlight (solar energy) can be transformed into electricity by using photovoltaic cells ("PV cells")—"photo" meaning light and "voltaic" meaning electricity. Wind Turbines (like windmills) turn the power of the wind into electricity by letting wind spin the blades to turn a generator that produces electricity. Solar energy and wind energy are completely renewable resources that are free and abundant. Natural gas, propane and other hydrogen containing fuels can supply energy without producing significant harmful emissions or toxins when transformed, for example, in a "fuel cell" which extracts the energy by a chemical reaction rather than by burning the fuel. Electrical energy from PV cells, wind turbines or fuel cells can be used as a direct source of electricity. PV cells, wind power, and fuel cells are known as "non-traditional energy technologies" or "New Energy Technologies."

Increased use of New Energy Technologies can make the Earth's air and water cleaner and slow or reverse the harmful effects of global warming. The environmental advantages of New Energy Technologies are well known, uncontested and vitally important.

New Energy Technology systems have been widely unavailable due to cost, consumer unfamiliarity, inaccessible financing options, unavailable expertise required to specify the options and configurations of available New Energy Technology systems for a particular residential, commercial or industrial use.

Among the major impediments to decreased cost is the lack of sufficient volume of demand. There is a 'chicken and egg' or 'catch-22' problem with developing increased demand and lowering the cost of the New Energy Technology systems. The greater the demand, the lower the unit cost; however, the high unit cost inhibits greater demand.

Introduction to and, design, configuration, financing, and installation implementation of a New Energy Technology system require specialized knowledge and equipment that is not readily available to even sophisticated commercial or industrial potential consumers. If a consumer wanted to install a New Energy Technology system, it requires finding a trained energy consultant (often called a "specifier") who would generally have to conduct an on-site assessment. The specifier would then have to take measurements in and around the structure, calculate how much energy is needed under various conditions, and determine what types of New Energy Technology systems are available by referencing a myriad of large specification books on industry standards and manufacturer specifications, which are difficult and costly to keep up to date because of the time and cost of publication, the difficulties of distribution and the speed with which the New Energy Technologies have been evolving. The specifier then must then have ready access locally, or must bring in from elsewhere, the electricians and installers who are trained to implement the installation. Also, although the New Energy Technology systems have lower variable costs than traditional electricity sources, the initial capital investment required of any individual purchaser is a significant obstacle for most. Therefore it is generally necessary to include in the mix of product and service providers necessary to sell New Energy Technology systems a financier who can provide the financing which can be repaid over time (or the lifetime of the system). In order to minimize the costs of financing, there needs to be sufficient volume and standardized financial and implementation criteria.

The whole process is complex and can take many days, weeks, months or years, and requires significant manual calculation and research on the part of various people with different specialty backgrounds and training. To date, it has only been done one customer at a time rather than in an automated way on a mass-scale, further contributing to the chicken and egg problem of insufficient demand and high prices.

As in most new technological developments, there are different applications of the New Energy Technologies for different segments of the market. However, it has been difficult and expensive for manufacturers of the technologies to locate the appropriate market segments for the narrow applications best suited to their particular technologies. One way to aggregate demand overall is to automatically and cost-effectively segment potential customers using demographics obtained from databases in conjunction with specific information provided by the potential consumers. However, currently, even if a consumer was motivated to explore the process, very few consumers even understand the units of measurement necessary to calculate the basic numbers a specifier would need to use to determine that consumer's needs.

Because of the complexity involved and the vast geographic spread of potential customers, the costs of acquisition and education of potential new customers are also very high. It has proven difficult or impossible to identify significant numbers of potential customers with some knowledge of New Energy Technologies or to educate significant numbers of people or companies who are good candidates for New Energy Technologies. The minimal demand keeps the cost of the systems high further discouraging demand and contributing to the chicken and egg problem described above.

Aware of both the extraordinary environmental promise of the New Energy Technologies and the problems of high cost and insufficient demand, many governmental entities offer or plan to offer incentives for consumers or manufacturers of New Energy Technology systems. However, due to the plethora of different governmental entities (federal, state, local, utility regulatory boards, public utilities, private utilities, tax authorities, etc.) and the many different types of incentives (e.g. subsidies, rebates, tax credits, depreciation allowances, pollution credits, etc.), it is extremely difficult for any consumer, manufacturer or distributor of a New Energy Technology system to understand or know the complete financial implications of a purchase, or to manipulate the parameters to provide a meaningful choice to a consumer.

In addition, the availability of specifiers, retailers, installers, and financiers is still scarce, extremely fragmented, inconsistent and inconvenient to access. Moreover, it is still difficult or impossible to identify and locate potential customers in a cost-effective manner and in sufficient numbers to use the demand to lower the costs.

The cost of educating significant numbers of potential consumers about the available technologies, their applications, and how they might be customized to a particular user's needs has been prohibitively expensive and has been left to non-profit entities with environmental goals. The high cost of educating the population contributes to the insufficient demand for the New Energy Technologies.

Furthermore, currently, energy consultants or specifiers must take all their measurements, do their calculations, consult the manufacturer catalogs, design the proposed system, figure out the financing, and present their customers with a proposal and price information before they even know if their customer will agree to install the system or pay the specifier. Since much of the income comes from commissions on the hardware, specifiers earn no income if the customer ultimately decides not to purchase. However, the specifier has already invested significant time and effort just determining if a customer might be interested. Therefore there is a need for a system which moves the specifier's efforts to a point in time after the customer has received the general outline of a proposal, with prices and costs, and has decided to purchase. The system disclosed herein accomplishes that.

Because of the difficulties described above, and the fact that the costs of purchasing and installing a New Energy Technology system have heretofore been far in excess of the cost of electricity produced by a local electric utility from the burning of highly polluting fossil fuels such as oil, coal or natural gas, there is currently virtually no market for non-polluting New Energy Technology systems. However, by combining the advantages and cost-reducing methods made possible by the system described herein, a mass customization system is disclosed which can create new mass markets for non-polluting New Energy Technology systems. Because the computerized system collects commitments from customers, aggregates the demand of many customers, and mobilizes customers to advocate for political and regulatory changes that make such systems more economically viable, the system creates new markets and is also capable of forecasting where the next viable markets for such systems will be.

For all of the above reasons, it is desirable to provide an automated New Energy Technologies Consulting and Demand Aggregation system ("NETCONDA") that is easily accessible, widely available, easy to use, and that postpones the specifier's work until after the customer has decided to purchase, creates incentives for potential customers to self-identify or to virally identify others they know who might also be potential customers, aggregates the demand from various different populations of customers, automates the process of specifying a particular customer's needs, reduces the cost of customer education and acquisition, and takes advantage of all available incentives and financing options.

SUMMARY OF THE INVENTION

An automated, computerized New Energy Technology Consulting and Demand Aggregation system ("NETCONDA") is provided comprising various information input portals and guides, that are linked to various databases and calculation programs for generating a collection of different kinds of reports or output and distributing them to the people or companies qualified to act on the data, such as the purchaser (customer), the manufacturer, the unit assembler, financier, specifier, installers, electricians, the local electric utility, and Company management of the user of the NETCONDA system. The entry point to the NETCONDA system is configurable to keep track of the referral source, thereby allowing incentives for users to refer their friends, family, business associates, contacts and neighbors to the system and dramatically expanding the outreach of the system and further decreasing the costs of customer acquisition.

The NETCONDA asks for simple measurements and energy use statistics for the building or site designated for the New Energy Technology sources. The data requested are in a form that most consumers can comfortably find and input themselves without a professional's assistance. The data is then processed to calculate the energy needs and other criteria of the building to be outfitted with a New Energy Technology system over time and in varying circumstances in terms that match the specifications in the database of available New Energy Technology products and accessories, such as photovoltaic cells, fuel cells, wind turbines, inverters, mounting or framing units and batteries.

Information on the appliances and current uses of electricity can be factored in and compared to databases on the energy usage of comparable products and/or complementary products so that consumers could be advised how to reduce their energy usage by purchasing more energy efficient appliances, changing their usage patterns, or purchasing complementary products or services. The system would provide them with information demonstrating the initial costs as well as the long-term cost savings of any proposal.

The calculations also draw from a database of climactic variations for different locations to assist in determining the appropriate energy output of various New Energy Technology systems and the costs or cost savings. The financial calculations draw from a database of available products, and a database of available specifiers, installers, electricians and financiers including their rates and capabilities, among others. They also draw on the database of manufacturer-specific, utility-specific or government-specific financial statistics and/or incentives (credits, rebates, and other kinds of discounts). All output is configured separately for use by the different interested parties: purchaser, manufacturer, specifier, installer, electrician, financier, utility, Company management. The output can identify single or multiple New Energy Technology systems as appropriate and can offer various options and combinations of systems, financing times, costs and discounts.

The NETCONDA system can also collect individual and aggregate statistics about the price, and/or payback time, at which customers have contracted or are willing to contract for installation of a New Energy Technology system. That data can be used to automatically or manually negotiate with the suppliers and affiliated providers volume discounts or pricing. For example, if the current unit price of a particular New Energy Technology system is 3, the system can begin scheduling sales to individuals willing to purchase installation at a unit price of 3 and collect data on how many are only willing to purchase installation if the unit price falls to 2 or 1. At the point at which enough customers have been signed up so that the supplier is willing to lower the unit price to 2, the customers are automatically informed, their installation contracts collected or confirmed, and the order is automatically (or manually) put in to the supplier. At a later time when demand has been aggregated sufficiently to justify a unit price of 1, the potential customers who had indicated a willingness to purchase at that price can be similarly contacted.

The NETCONDA system is also capable of receiving and tracking approvals, price quotes, scheduling constraints, schedules, and other responses from the various interested parties in a transaction, as well as keeping track of referrals and the potential commissions payable to the users and other interested parties.

The NETCONDA system takes input interactively from a website on an electronic network such as the internet, from a computer or personal digital assistant capable of connecting to such an electronic network, or from a telephone or related communications device capable of delivering information to such an electronic network or directly to the NETCONDA system.

BRIEF DESCRIPTION OF THE DRAWINGS

The following description is better understood in conjunction with the drawings in which.

DETAILED DESCRIPTION

Figure 1:
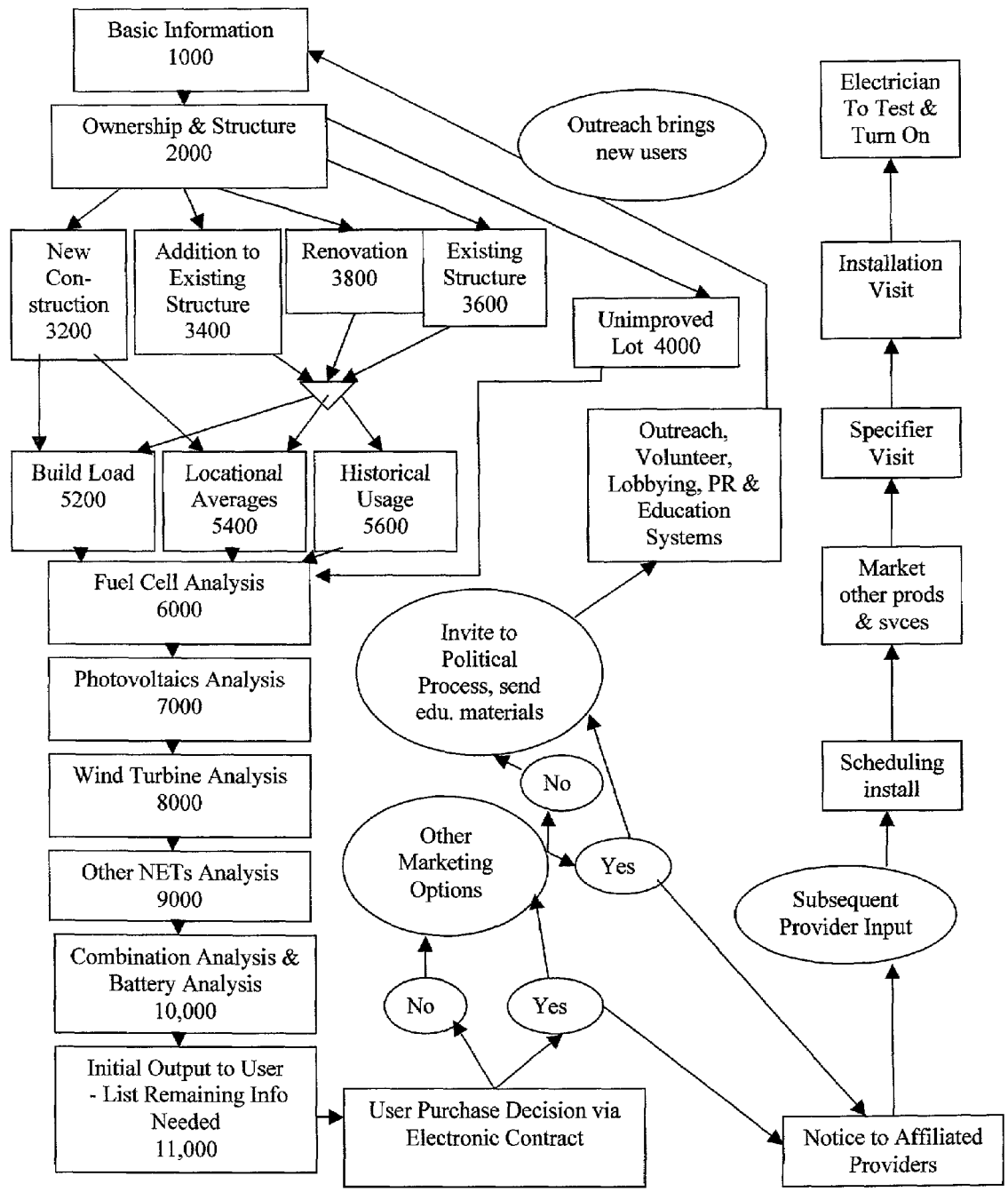
FIG. 1 depicts a flow chart for one embodiment of the New Energy Technology Consulting and Demand Aggregation system according to the principles of the present invention.

An automated New Energy Technology Consulting and Demand Aggregation ("NETCONDA") software-based system for implementation either via an electronic network such as the Internet (on-line) or off-line is disclosed. An input solicitation system consisting of a series of questions which are posed to a user singly or in groups seriatim or via a form or forms to fill in, obtains specifications and information on an existing or planned, residential, commercial or industrial site or structure's energy needs, usages, costs, and other items. This information is processed and databases are consulted to determine what kind of New Energy Technology sources are available and cost-effective to meet the actual or planned needs and what the costs and financing options are. Then, multiple reports, reminders or communications are generated containing requests for further information, contracts, configuration options, cost estimates, affiliated service provider availability, financing options and sources, and any other information necessary for the purchaser to commit to the purchase and the affiliated service and product providers to provide their services or products on schedule. The system allows repeated partial input of data and modifications of previously input data, and can track the progress of information and decisions concerning the purchaser and each of the affiliated service or product providers.

Referring to FIG. 1, there is shown a flowchart for one embodiment of an automated, on-line New Energy Technology Consulting and Demand Aggregation system according to the principles of the present invention. Only the preferred embodiment is presented throughout, although customization is possible and in some ways required according to the products and services available at a given time, as well as the depth of climate information available, the absolute and relative cost variations in the available New Energy Technologies, the legal and regulatory circumstances present at the time, and other criteria.

First, basic information, such as name, address and contact information, is obtained 1000 through one or more on-line forms or series of questions. All the on-line forms can reside on a website and be accessible from any PC with an Internet connection, or can reside on a desktop computer or portable computer not connected to the Internet, or can reside on a hand-held computing device, such as a PDA. The series of questions could also be presented via a series of telephone recordings and a device to record the responses. If collected off-line or on a computer system not directly connected to the main processing computer, database and web servers, the information would be transmitted to the main database and processing computers via email, via TCP/IP, via telephone lines, via a cellular phone or wireless communicator, via an infrared data transmission device or via any other mechanism for the transfer of data over distance. Any information previously input concerning the user or their structures or sites is used to tailor the forms or questions presented.

The location information, for example, the zip code is used to determine what state a customer is in and therefore what regulatory regime applies. For example certain states have enacted net-metering laws which require the local utility to buy back electricity generated at the customer's site if it is generated via a non-polluting method such as via PV cells or fuel cells or wind turbines. Some states require the utilities to buy back such electricity at the same retail rate at which the utilities sell electricity to the public. Other states or municipalities or utility districts have legislated tax credits or subsidies or rebates which dramatically affect the ultimate cost of a New Energy Technology system in that state.

The location information, for example the zip code, is also used to determine from the climate databases the amount of average insolation in that area. Such information can be used to calculate the electric output of a particular size array of PV cells. For example, if the average insolation per year is 1200 hours for a particular location, and the customer reports having used or anticipating demand of 12000 kWh per year, then a PV system would have to be sized at 10 kW in order to produce all of the 12000 kWh that customer is anticipated to use over the course of a year.

The location information, for example the zip code, is also used to determine which utility district a customer is in, and therefore what the price of electricity is for that customer. For example, if the price of electricity is $0.114/kWh and the customer reports having used or anticipating demand of 12000 kWh per year, then the system can calculate the total electric costs at $1368/year or $114/month. That figure can then be used to determine the financing options relative to what the customer is currently paying for electricity, or to set the customer's new billing rate after installation of an energy generation system. For example, if the customer is willing to pay the same rate it is paying currently for electricity, and has a 10 kW system installed that provides 100% of his needs, he can finance it with $114/month. Or, if the customer is seeking to cut his electric bill in half, he can only finance $57/month.

An identification of the structure or site to be outfitted with the New Energy Technology system is entered next 2000 along with specifications and ownership information. Each user may enter information for more than one structure or site. Depending on whether the structure or site is an existing structure or site, a new structure being planned for construction, an addition, a renovation, or an unimproved lot, the system goes to one or more subroutines such as a new construction module 3200, existing structure 3400, renovation 3600, addition 3800, or unimproved lot 4000 which queries information which is pertinent to that situation.

Depending on whether the structure is an existing structure, a new construction, an addition, or a renovation, the system offers three methods for determining the actual or expected energy use. The Historical Usage method is represented by module 5200, the Locational Averages method by module 5400, and the Build Load method by module 5600.

The three methods could be used singly or in combination. For example, in considering an addition to an existing structure, a user could rely on historical data first, then build the additional load by specifying which new appliance will be installed with the addition. Or, the user could use historical data for the existing structure, but use the average energy usages for that location to take into account the addition. At any point, the system can omit questions determined not to be necessary based on the responses to prior questions. Wherever possible the system will present choices based on a database of all the possible choices, such as the names of all states, countries, utilities, etc. Based on location and the names of utilities, the system calls up data concerning climate statistics, the costs of retail electricity, natural gas and other fuels, and any other relevant data. If the user has previously input information, that information can be subsequently corrected or updated.

After obtaining information about the site or structure and the current sources of energy and the current energy usage and cost, the system begins its calculations to evaluate the availability and cost-effectiveness and practicality of the available New Energy Technology sources. The user can be asked about the possibility or desirability of installing various New Energy Technology systems and obtains information relevant to making those decisions. For example, users might be shown a picture of a wind turbine and then asked if they would be amenable to having a similar one atop the roof or somewhere else on the property. If they answer affirmatively, they would be queried 8000 about possible locations on the property and the proximity of mountains, trees, structures or other obstacles that might obstruct the wind, and their location would be compared to a database of wind corridors and conditions. Similar options lead to the subroutines concerning fuel cells 6000 and photovoltaics 7000. For example, users interested in fuel cells would be asked if they had a ready supply of natural gas or propane, those interested in PV cells would be queried about whether they had roofs facing south, trees or buildings obstructing the sun, and enough roof space for the PV cells.

Even if a user is not interested in a particular option, some information can be collected in order to reconsider the user's appropriateness for a particular technology in the future as advances are made and costs change. The system can also query about other forms of energy use, such as transportation fuel, microturbines, geothermal possibilities, micro-hydro-power or biomass possibilities. Some of the questions may relate more to marketing needs or business research issues than just information directly necessary to specify a New Energy Technology system. Other questions seek to determine whether replacing energy inefficient appliances with more efficient versions will be cost-effective. Wherever a user indicates the answers to certain questions are unknown, the system can consult databases for averages or typical information corresponding to that user's profile and/or location.

After the above information is obtained, the system calculates how much energy is used by and/or necessary for the customer, what kind of New Energy Technology systems are available, and what type or types of New Energy Technology systems would be sufficient for various levels of energy output, energy savings, cost profiles or financing profiles. Reports, spreadsheets, contracts, purchase orders, requests for availability, requests for quotes, option outlines, and other output based on the calculations, database matches, and conclusions or options are generated as appropriate for the customer, the affiliated providers, other interested parties, and for management. The output can be specifically tailored to the data the user input, the manufacturer specifications available, the financing context, the local conditions at the customer's area and site, the climactic conditions for which data is available, and other criteria as appropriate.

Now referring to block 1000 on FIG. 1 labeled Basic Information, this section of the input system would comprise questions eliciting the basic information desired. The system would ask questions such as the user's name, address, phone, cellular, mobile and/or fax numbers, permanent and preferred email addresses. It would also ask for, for example, the name of the structure or site for which the user wants to input information first (information can be input for more than one structure or site, but each must be given a name, such as "home", "office", "garage", "barn", "fallow plot", etc.) and the type of site it is, e.g. residence, office building, garage, farm building, unimproved land, industrial land, etc. The system generates a system number for the user and can request the user number of the person who referred the user to the system, which can be used for, among other things, keeping track of referrals and any commissions due, and encouraging referrals through automated email notices. The system would also ask what kinds of interests the user has, including for example, a New Energy Technology system that provides for all the electric needs of a structure or site, a system that provides part of such needs, a backup system in case of loss of primary power systems, assistance in reducing energy usage or costs, or other products or services available through the system. Since users can return to the system after having previously entered information, there can also be questions eliciting whether user wants to continue where the process was interrupted the previous time, or wants to review, edit or modify the data already entered, or wants to input data for a different structure or site.

Depending on the responses, the appropriate sections of the system would be activated and the appropriate questions, notices, and educational output generated. The system will use the address information to locate any rules, regulations and laws in the user's area as well as any climactic data that would impact the options available to the user. In some cases, the resulting information will trigger additional questions relating to the rules, regulation, laws or climactic conditions. For example, where there are discounts or rebates in a particular jurisdiction, additional questions would focus on the eligibility requirements.

Now referring to block 2000 on FIG. 1 labeled Ownership and Structure, for each named structure or site, the system would request information on the type of structure or site, for example, commercial, industrial, rural, unbuilt, or residential, and depending on the response, would ask for the user's relationship to the structure or site (homeowner, business owner, tenant, employee, government official). If rented, the terms of the rental and utility bill payment would be queried where appropriate. If permanent fixtures are not permitted or desired, the system would limit consideration to more portable options. Questions relating to the condition of the electrical system, such as its age, and whether it used circuit-breakers or fuses would also be asked, to determine the likelihood of components of the existing electric system needing replacement.

Now referring to blocks in the 3000 range on FIG. 1 labeled New Construction 3200, Existing Structure 3600, Addition to Existing Structure 3400 and Renovation 3800, if new construction is involved, the user is taken along the new construction pathway of the program to determine the particulars about the construction, including questions designed to permit estimations of the anticipated energy use, and the scheduling of the construction. For example, users can be asked if they would consider roof shingles made of or with PV cells (also known as Building Integrated PV or BIPV) or skylights made of PV. Because New Energy Technology sources can co-exist with other energy sources, the user can also be asked about other electric supply sources such as the utility grid or other backup or primary sources. If it is an existing structure, or an addition to one or a renovation of one, the corresponding questions are tailored to the specifics of that situation. In any case, among the questions to be posed are whether the site or structure is already on the electric grid or ready to be hooked up to it. All or almost all of the New Energy Technologies taken into account by the system can be used in conjunction with the electric grid (grid-connected) or disconnected from the electric grid (grid-independent).

Now referring to block 4000 on FIG. 1 labeled Unimproved Lot, the system would request the size or area of the site, the elevation, the gradients and slopes, the presence of wind obstacles or solar obstacles, and the availability of the existing electric grid. Additional questions would seek to determine if there are any obstacles to the use of fuel cells, PV, wind turbines, and possibly geothermal, biomass, micro-hydropower, and microturbines. Other questions would seek information on the proximity of transportation methods, and would access a database on the cost of extending the electric grid by certain distances.

Now referring to blocks in the 5000 range on FIG. 1 labeled Historical Usage, 5600, Locational Averages 5400, and Build Load 5200, the system provides three methods for evaluating the energy load for which provision must be made. The first method is for the system to seek information on the consumer's historical use of electrical power 5600. It would be input by the user or solicited electronically from the user's utility with the user's authorization. The second method 5200 is to build the load from the specific electrical appliances and applications in use or to be in use. For example, the system can offer the user a list of appliances such as refrigerator, washer, dryer, microwave oven, etc. and the user would check how many of each was installed and for some how often it was used or how large a unit it was or what type. Then the system would use a database of average energy usage for such appliances to add up the expected electricity usage. The third method 5400 is to use averages for the user's location, type of structure, size of structure, age of structure, and typical use of structure. For example a 3000 square foot one-story residential home in a particular area where the occupants are out of the house during most workdays would typically use x amount of electricity in the various seasons.

For the Historical Usage 5600 module, the system proceeds to determine from a database, or requests selection or input of the name or names of the electric distribution utilities and/or the electricity generation or electricity service companies used or available. For certain utilities that permit it, the user's account number and password, PIN code or authorization can be used to obtain the account profile, history, rate class, and other costs directly from the utility's database. For others, the user would be requested to obtain that information from the users' electric bills. Ideally information should be obtained on each month of most recent year. However, the system can also take data from Winter and Summer months or Winter, Summer, Spring and Fall months and average them to obtain the required data. If the data is not from the current year, the user is prompted to enter the year the data is from.

For the Locational Averages 5400 module, comparable information can be obtained from a database of average energy usage patterns for a particular location, a particular type of structure, a specified size structure, the number of residents or employees expected, and/or a certain age of the structure. Users can be given the opportunity to add to the averages to take into account energy-intensive applications such as power tool usage, usage of compressors or extra refrigerators or air-conditioning units, or other unusual equipment.

For the Build Load 5200 module, comparable information can be calculated from a list of energy uses and/or appliances present or contemplated. For each appliance that the user chooses from a list, including sublists possibly indicating the size, type, usage pattern (how long it is used each day or week, during what months of the year it is used, etc.), make or model of the appliance, the database has a corresponding average energy usage. Once the list of appliances being used or to be used is chosen by the user, the system calculates the total energy usage and any other relevant data.

Even if the user chooses the Historical Usage or Locational Averages methods, since newer appliances often are, and/or are required to be, more energy efficient than older versions, the program can solicit information about the make, model, year and energy efficiency rating of various appliances commonly found in most homes or businesses, such as clothes dryers, clothes washers, dishwashers, refrigerators, room air conditioners, direct heating equipment, pool heaters, water heaters and boilers, central air conditioning units, heat pumps, furnaces, fluorescent and incandescent light bulbs and fixtures. Comparable data can be solicited for commercial or industrial sites or structures. Users can also be asked whether they plan on installing any new appliances or office equipment that might affect the calculations. This information can be used to determine if energy and cost-savings are possible by substituting more energy efficient appliances for older ones.

The data collected or estimations made concerning energy usage are used to calculate the total energy usage (actual or planned) as well as the average and peak usage at different times of the year or different times of day. In addition the cost of electricity per month and per year is calculated. The sizing of the New Energy Technologies that could be used to provide all or part of the energy load of the structure or site could be determined from the above data and calculations.

Now referring to block 6000 on FIG. 1 labeled Fuel Cell Analysis, for each of the New Construction, Existing Site or Structure, Addition and Renovation, the system would inquire about the availability of, the current usage of, and the costs of natural gas, propane and/or other hydrogen fuels (at different times of year or averaged) which can be used to power a fuel cell. If there is such fuel available, for each use of fuel, or the proposed use, the system would inquire about which appliances use that fuel and/or how the fuel usage changes in different seasons or months. Depending on the criteria of the appropriate fuel cell systems in the database of available products and services, the system can ask questions relating to, for example, the availability of ventilation, open space, the electric grid and/or storage space or the need for extreme peaking capacity or for a fuel cell to constantly match the load demands. The system then matches the user's energy needs and the cost and availability of various fuels with the type and kind of fuel cell appliances which are available and the type and cost of any installation that would be necessary. Each product's electricity output and the corresponding installation, usage and maintenance costs are calculated for later use in presenting the user with options as to cost and financing. In grid-connected mode, the electricity output of the devices is equal to the hourly output multiplied by the number of hours of use multiplied by the retail cost of electricity (or the price at which that jurisdiction permits sale of electricity back to the utility), adjusted for seasonal rate variations. The cost savings will be used later by the system in calculating the financing costs and options.

Now referring to block 7000 on FIG. 1 labeled Photovoltaics Analysis, for each of the New Construction, Existing Site or Structure, Addition and Renovation, the system would inquire about which surfaces on the structure or site could support a PV array. For example, a house may contain several different roof faces (one facing east, another facing south, a third on a separate garage, a fourth on a lean-to that could be constructed on vacant land). The system permits inputting data on multiple surfaces. For each existing or proposed surface (hereinafter referred to as "roof" for convenience), the condition and spatial orientation of the roof is evaluated. In one embodiment, such information would be extracted from a database of satellite or aerial photography showing the orientation of the roofs along the north-south or east-west axes. The age, history of leaks, and general condition of roofs could be inquired along with the materials from which the roof and/or shingles are made. The angle of the roof to the ground would be determined by asking the user to click on the drawing of a slope that best represents the slope of the roof. Also, the user can be asked to choose the orientation to South best representing the slope of the roof, or if that is not known, can have the user input the time of day which can be used along with the user's location information to generate a series of images, from among which the user could choose the one best representing the position of the sun relative to the roof surface at that time. The surface area of the roof can be determined by requesting the length and width and multiplying that by the angle created by the slope. The size of the roof determines how large a PV system can be installed and, along with the slope, the costs of installation. The position and slope of the roof along with the amount of solar radiation historically recorded in that location according to the climate databases can be used to determine the amount of energy a PV system will generate and therefore the amount of savings in monthly or annual electricity costs. In general, for any particular slope facing south, the rated wattage of a PV system multiplied by the number of hours of average annual solar radiation in that location according to the published database equals the annual electricity output of the PV system. For roofs not facing directly south, a percentage is deducted for each gradation away from south the roof is facing. The system then matches the user's energy needs and the cost and availability of various types, makes and sizes of PV and calculates the cost of the available options taking into account the installation, wiring, inverter, and frame that would be necessary along with the time of the specifier who confirms the measurements made by the user and confirms the order, the installers who connect the system, and the electrician who tests and turns on the system. This data is used later in presenting the user with options as to cost and financing. In grid-connected mode, the electricity output multiplied by the retail cost of electricity (or the price at which the local jurisdiction permits sale of electricity back to the utility), both adjusted for any seasonal variations, represents the total savings to the user from installing the PV system. The cost savings will be used later by the system in calculating the financing costs and options. In the grid-independent mode, the system consults the climate database and shows data concerning the maximum number of days without significant solar radiation likely to occur in the next 25 years. Then the energy load of the site or structure for that time period (or another chosen by the user) is calculated to determine the capacity of the batteries or complementary New Energy Technologies that will need to accompany the PV system.

Now referring to block 8000 on FIG. 1 labeled Wind Turbine Analysis, for each of the New Construction, Existing Site or Structure, Addition and Renovation, the system would inquire about the possibility of wind power as a source of energy by showing various size wind turbines and asking if the user would consider such a device on a roof, mountain, or field on the property. For each such potential location, questions would be posed concerning the elevation of the site (which in the case of a roof can also be estimated from the number of floors of the building), the presence of any obstacles to the wind, and the proximity to the nearest large body of water, all of which affect average wind speed. In addition, the size of the property or roof would be queried to assist in determining how many wind turbines of different sizes can be placed in any particular location. In addition, wind speed data for any particular location is taken from a database. Given the electricity needs of the user and the possibility of using particular locations for wind turbines, the system can match various wind turbine options and numbers and calculate the amount of electricity likely to be produced by each and the installation costs, maintenance costs, and cost savings. In grid-connected mode, the expected electricity output multiplied by the retail cost of electricity (or the price at which the local jurisdiction permits sale of electricity back to the utility), both adjusted for any seasonal variations, represents the total savings to the user from installing the wind turbine. The cost savings will be used later by the system in calculating the financing costs and options.

Now referring to block 9000 on FIG. 1 labeled Other New Energy Technologies (NETs) Analysis, the same type of analysis and calculations as the system does with fuel cells, wind turbines and PV, can also be done with other New Energy Technology systems which are non-polluting, or use renewable resources, or are otherwise more environmentally friendly than the alternatives they replace, or which otherwise are suitable for grid-independent applications, such as biomass, biodiesel, passive solar heaters, microturbines, geothermal energy, or micro-hydropower.

In the process of calculating the costs of each New Energy Technology system, in the same way that the system matches the user's needs against the database of available New Energy Technology products, it also matches the user's needs against a database of ancillary required products as well, such as inverters, batteries, energy-efficient appliances, frames for PV systems, ballast for Wind Turbines, protective coverings or venting mechanisms for fuel cells, electric wiring, etc. and for each determines the appropriate size, quantity, availability and costs.

Once the list of appropriate equipment options is generated, and materials, installation and financing costs are calculated and totaled, including a specifier's time to confirm the specifications and measurements, the installers' time and materials including any framing and/or mounting materials, and the electrician's time and materials. Then a spectrum of options can be ordered by time horizon (whether 5 years, 10, 15 or 20) so that the user can later choose the time horizon they are interested in. Over such period of time the costs and savings of each system can be calculated and the systems ranked on a scale of least costly to most. Associated with each system are also the resources of the user that are engaged by that system and the electricity needs addressed by that system. For example, with PV systems covering the entire roof, there might not be sufficient roof space left for attaching any wind turbines to the roof. Or, if a large fuel cell system is installed as the least costly technology over the chosen time horizon, it may cover the entire electricity needs of the user and there may not be any electricity need left for any other systems to address.

As other New Energy Technologies become technologically possible and commercially viable, their usage data and a database of the available products, services and their specifications and costs can be implemented in the system. Such New Energy Technologies might include biomass, biodiesel, geothermal, passive solar, micro-hydropower, or micro-turbines. Since the advance of technology generally results in increasing capabilities at decreasing costs, it is advantageous to have an automated energy consulting system that systematically incorporates new underlying technologies and thereby reduces the costs to new customers and expands the number of customers who can benefit from the system.

Now referring to block 10,000 on FIG. 1 labeled Combination Analysis and Battery Analysis, for each of the New Construction, Existing Site or Structure, Addition, Renovation, and Unimproved Lot, and depending on whether the user has chosen to request a system to meet all of the structure or site's energy needs or only a part of such needs, or only an emergency backup system, for example, a single emergency backup circuit, the system takes the partial or total energy load or expected load or desired load, if any and determines which available products can meet it individually for each of the New Energy Technologies. For example, it determines how much PV, what capacity fuel cells, and what capacity wind turbines are necessary to individually meet the entire load. For an Unimproved Lot it calculates the maximum and expected energy output for each type of New Energy Technology. For PV and wind turbines, in grid-independent mode, it also calculates the capacity of the batteries necessary to provide the full load for the amount of time indicated by the user based on climate database information. The system is also capable of being programmed to build in certain buffer factors to ensure that a user is given conservative estimates or to skew the system to offer somewhat more capability than might be justified solely by the numbers input and derived from the various databases.

For both PV and Wind, in the grid-independent mode, the system consults the climate databases and shows data concerning the maximum number of days without significant solar radiation (or wind) likely to occur in the next 25 years or other period. Then the energy load of the site or structure for that time period (or another chosen by the user) is then calculated to determine the capacity of the batteries that will need to accompany the PV or wind turbine system.

If there are any constraints which eliminate a particular technology, for example, no availability of fuel would preclude use of fuel cells, or location in a protected valley with very little wind would preclude wind turbines, or location in the shade of evergreen trees which cannot be removed would preclude PV, then the system eliminates it from consideration.

For Grid-Connected situations, the system begins with the least expensive New Energy Technology, tracks the output and costs of the system required to meet the full load requirements without batteries, including installation, maintenance, inverter, wiring, and financing costs over the expected lifetime of the system and taking into account the time horizon chosen by the user, plus the resources occupied by the system, including the roof surfaces or land areas required in the case of PV or Wind Turbines, plus the portion of the peak and maximum loads which are not covered by that New Energy Technology, such as nighttime loads with a PV system.

The system then prices the remaining systems including the same New Energy Technology supplemented with a battery, for the remaining portion of the peak and maximum loads. For example, if PV without battery was the least expensive individual option but there was room on the roof for a PV array which could cover only 50% of the loads, then the system would evaluate Wind Turbines and Fuel Cells (PV with batteries would not be included in this situation because there was no roof space remaining for additional PV) to see which was the least expensive provider of the remaining loads. If Wind Turbines are calculated to be the next lease expensive option, but there is no more remaining room on the roof surface for attachment of the Wind Turbines, then the system chooses the next least expensive option.

After each iteration of this calculation, the system adds on the next chosen New Energy Technology and updates the tracking of the loads covered, loads remaining, and costs. After reviewing each of the New Energy Technology options in order of their cost-effectiveness for the marginal load needed to be covered, the system concludes by identifying the top x number of options and reporting on them. Among the options ultimately considered by this approach are each of the New Energy Technologies separately, all of them together, and each permutation of combining them. For example, for the three New Energy Technologies of PV, Wind Turbines and Fuel Cells, there are seven options: PV alone, Wind Turbines alone, Fuel Cells alone, all three, PV and Wind Turbines, PV and Fuel Cells, or Wind Turbines and Fuel Cells.

Each option can also be presented via more than one financing alternative. For example, the same PV system could be financed at the rate of $x/month for y years or $(x minus z)/month for y+w years or $(x+z)/month for y−w years.

For Grid-Independent situations, the system also begins with the least expensive New Energy Technology, but also includes a fourth technology: the battery capacity necessary to provide all of the maximum load at any time of the year. If one of the New Energy Technologies is selected as least expensive (and not the battery system which cannot be chosen alone since it requires an energy source to charge it), then the system tracks the output and costs of the system required to meet the full load requirements without batteries, including installation, maintenance, inverter, wiring, and financing costs over the expected lifetime of the system and taking into account the time horizon chosen by the user, plus the resources occupied by the system, including the roof surfaces or land areas required in the case of PV or Wind Turbines, plus the portion of the peak and maximum loads which are not covered by that New Energy Technology, such as nighttime loads with a PV system.

The system then prices the remaining systems including the battery, for the remaining portion of the peak and maximum loads. For example, if PV without battery was the least expensive individual option but there was remaining need for night-time and bad weather load coverage, the system would price the remaining options of batteries, Wind Turbines or Fuel Cells and choose the least expensive. When Wind Turbines and PV are the technologies being included, the system can overlay the data from the database on insolation for that particular area with the data from the database on historical wind patterns to determine the extent to which those two technologies complement each other's time-oriented generating capabilities so as to decrease the remaining load. For example, although bad weather generally compromises the capabilities of PV, it also tends to be a time of increased wind. Similarly, PV generates no electricity at night, but winds tend to pick up at night in many areas.

After each iteration of this calculation, the system adds on the next chosen New Energy Technology and updates the tracking of the loads covered, loads remaining, and costs. After reviewing each of the New Energy Technology options in order of their cost-effectiveness for the marginal load needed to be covered, the system concludes by identifying the top x number of options, as chosen by management or the user, and reports on them.

For an Unimproved Lot 4000, the system uses the size or area of the site, the elevation, the gradients and slopes, the presence of wind obstacles or solar obstacles, and the availability of the existing electric grid to calculate the possible generation quantities for each form of New Energy Technology (Fuel Cells, PV, Wind Turbines, and possibly geothermal, biomass, micro-hydropower and microturbines) individually, and calculates the cost of installation of each, includes financing costs, and creates reports indicating the startup capital necessary, operating costs likely, cash flow expected and period-specific or lifetime returns on investment for each identified option or combination of options.

For each New Energy Technology system on the spectrum of options, the financing can be calculated in several ways. One will usually be to calculate the payback period after financing while holding the payment amount to the same monthly payment the user is currently paying for the electricity expected to be generated by the New Energy Technology system. In addition, the user could be offered one or more options at a smaller monthly payment and therefore a longer payback period, and one or more options at a larger monthly payment and therefore a shorter payback period. The time period for paying back the installation costs is determined given the financing information available in the database or via real-time link with the financing agency or bank for each of the options identified. Even before specific financing options are identified, the system has the capability to automatically perform real-time credit checks and match the results with the financing companies' standards. Among the financing options that can be offered to customers are: to keep monthly utility costs the same as current resulting in a specific payback period; to reduce the monthly costs and lengthen the payback period; and to increase the monthly costs and decrease the payback period.

In determining the prices, monthly payments, total payments, and/or payback periods, the system is capable of basing the prices on the costs of acquisition of the components and the labor costs of specification, installation, and testing along with the financing costs and return on investment. It is also capable of basing the prices, monthly payments, total payments, and/or payback periods on the user's stated price elasticity or tolerance. For example if a certain quantity of users indicates a willingness to install a particular system if it will result in a monthly savings of $x, the system could set that as the price offered, even if such a price is above the calculated costs of acquisition of the components and the labor costs of specification, installation, and testing along with the financing costs and return on investment. The system can do the same thing with respect to the payback periods or other criteria.

Now referring to block 11,000 on FIG. 1 labeled Initial Output to User List - Remaining Info Needed, after the combination analysis and battery analysis produce a short list of options for a user, the system generates a report or email to the user reporting such options and identifying any information that would be helpful for the system to refine and provide more accurate choices, and also soliciting the user's approval of one or more of the options via the signing, or the electronic equivalent, of a contract for the purchase and installation of the selected New Energy Technologies according to the terms provided. Additional marketing information and/or options could be provided as well. And reports are generated for management at each step of the process that management decides it wants reports on.

Because the customer's commitment to purchase is obtained from the automated system before the involvement of an energy consultant or specifier, the costs associated with sending such a specialist to the customer's site are avoided for potential customers who are not eligible for the systems or who do not have a genuine intention to purchase, and the overall costs of customer acquisition are reduced.

The user's approval may be returned to the system online or by email or by any other input method. If the user approves of one of the options and signs the contract, notices are automatically sent, or generated for management to manually send, to each of the affiliated product or service providers required to complete the installation or financing of the New Energy Technology chosen by the user. For example, if the user is located where the Company does not have a specifier, a notice would be generated to specifiers closest to the user, informing them of the purchase of a particular product and soliciting their services at a particular price and on particular terms. A specifier's consent to such terms could be returned to the system by email or any other input method. Similarly, a purchase order or request for confirmation of availability, terms and price would be generated automatically or manually for each of the products comprising the system being purchased by the user, and the response thereto recorded after being returned by email or any other input method.

Once each of the affiliated product or service providers has responded to the communications from the system indicating that it's participation, terms, and scheduling are confirmed, the user is contacted and provided the scheduling options and final details. During this process, once it has been confirmed that the user will be purchasing, it is possible for the system to inform the user of any other products or services that may be available, particularly if the specifiers, installers or electrician that will be visiting the user for the installation are capable also of installing or configuring any of the other products or services being made available by the Company. After confirmation from the user of the scheduling, the system would send confirmatory notices about the scheduling and any final details to the user and to all affiliated providers.

If the price provided to a user depends on a certain volume of purchasing or depends on the price of a component service or product dropping to a certain level, the system will aggregate demand until those conditions are met before notifying management and, if programmed to do so, the user and any other affiliated product or service providers. This aggregation of demand facilitates bulk purchasing of components and therefore reduces the unit costs to the customer.

If the user does not sign the contract, electronically or otherwise, the system can send automated follow-up reminders and additional education materials, or can use the data about the user's energy profile, needs and desires to automatically or manually send the user marketing information about other products and services. It can also offer the user the option of submitting questions they would like answered, or having a specifier contact them.

Whether or not a user chooses to purchase a New Energy Technology system, and whether or not a user chooses to purchase any other products or services through the disclosed system, the user is invited to participate in the outreach, volunteer and political advocacy aspects of the Company's goals. For example, a user who chooses not to purchase because the price is too high can be automatically or manually invited to participate in lobbying activities designed to persuade their local government to enact incentives that will lower the price of New Energy Technologies for them, or to enact legislation require their local utility to buy back, at the retail rate, energy generated without causing pollution. They could also be invited to participate in spreading the messages of the Company through volunteer work, referring others to the system, or participating in generating additional press and publicity. Finally, they could also be presented options for purchasing other environmentally friendly products or services, or could be sent educational materials, for example, teaching how to reduce electric bills by reducing energy usage or eliminating phantom electricity usage. Since there are benefits to society to encourage the use of non-polluting New Energy Technologies rather than polluting traditional energy sources such as the burning of oil, coal or natural gas, the system will track and make use of customers' and volunteers' willingness to assist with outreach and generating unpaid publicity.

Even after a specifier has visited the user's site or structure, confirmed the details and measurements and the options offered by the system and/or chosen by the user, modified or corrected the information in the system and finalized the purchase plan, and after the New Energy Technology system in installed, tested and turned on, the system can keep track of the payments made by the user, the savings accruing to the user, and can continue to send to the user marketing materials concerning other environmentally friendly products and services available from the Company. In addition, such a user could also be sent periodic information educating them about the environmental issues and soliciting their support through volunteer activities, lobbying and political activities, and outreach and publicity activities.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A computer-implemented, non-buyer-driven method for facilitating the selection, purchase, configuration and installation of non-fossil-fuel-burning energy generation equipment using volume pricing and purchase commitment aggregation, comprising the steps of:
    (a) establishing an automated, Internet-based, interactive and centrally-managed energy consulting system having a computer and a main database;
    (b) using the computer to perform a search of a plurality of equipment suppliers' databases for specification data and pricing data for non-fossil-fuel-burning energy generation equipment;
    (c) collecting and storing, in the main database, selected portions of specification data and pricing data found during the search;
    (d) determining at least one volume discount price level associated with at least one equipment demand level for non-fossil-fuel-burning energy generation equipment available from at least one equipment supplier;
    (e) collecting and storing, in the database, energy usage data and site resource data received interactively from at least one customer;
    (f) determining by the computer, based on the energy usage data and the site resource data, a feasibility of acquiring and installing non-fossil-fuel-burning energy generation equipment for the customer;
    (g) calculating by the computer, using the equipment specification data, equipment pricing data, energy usage data, site resource data, volume discount price level and equipment demand level, a proposed configuration of non-fossil-fuel-burning energy generation equipment and proposed price at the volume discount price level for the proposed configuration for the customer;
    (h) transforming by the computer the equipment specification data, equipment pricing data, energy usage data, site resource data, volume discount price level and equipment demand level into a proposed equipment acquisition contract, and providing the contract to the customer;
    (i) receiving an executed, contingent equipment acquisition contract from the customer, prior to the expenditure of funds to acquire equipment and pay for a site visit by an energy consultant, which contract becomes binding only if an aggregate number of a plurality of customers executing acquisition contracts reaches a threshold level equal to or greater than the equipment demand level associated with the volume discount price level, and which contract remains non-binding if said aggregate number does not reach said threshold level;
    (j) aggregating the contracts executed by the plurality of customers to calculate an aggregate equipment demand level;
    (k) notifying the customer when the aggregate equipment demand level reaches a level equal to or greater than the equipment demand level associated with the volume discount price level;
    (l) using the computer to facilitate acquisition of the equipment from at least one equipment supplier; and
    (m) using the computer to facilitate installation of the equipment at a customer location.

2. The method of claim 1, in which the site resource data comprise data on customer geographic location, orientation of structures, access to an electric power grid, availability of sunlight, availability of space for photovoltaic cells, availability of wind, availability of space for wind turbines, availability of hydrogen-based fuels, availability of space for fuel cells, applicable utility tariffs and applicable governmental regulations.

3. The method of claim 1, in which the energy generation equipment is based on at least one of the following technologies: photovoltaic, wind turbine, fuel cell, batteries, geothermal, passive solar, biomass, microturbines and micro-hydro systems.

4. The method of claim 1, in which each customer is automatically matched with at least one of a trained specifier, a trained installer, or a trained electrician.

5. The method of claim 1 further including the step of using the computer to automatically send invitations to customers to join organizations.

6. A system comprising:
    a main database;
    a computer coupled to the main database;
    wherein the computer is configured for:
    (a) performing a search of a plurality of equipment suppliers' databases for specification data and pricing data for non-fossil-fuel-burning energy generation equipment;
    (b) collecting and storing in the main database selected portions of specification data and pricing data found during the search;
    (c) determining at least one volume discount price level associated with at least one equipment demand level for non-fossil-fuel-burning energy generation equipment available from at least one equipment supplier;
    (d) interactively collecting, and storing in the main database, energy usage data and site resource data from at least one customer;
    (e) determining by the computer, based on the energy usage data and the site resource data, a feasibility of acquiring and installing non-fossil-fuel-burning energy generation equipment for the customer;
    (f) calculating by the computer, using the equipment specification data, equipment pricing data, energy usage data, site resource data, volume discount price level and equipment demand level, a proposed configuration of non-fossil-fuel-burning energy generation equipment and proposed price at the volume discount price level for the proposed configuration for the customer;

(g) transforming by the computer the equipment specification data, equipment pricing data, energy usage data, site resource data, volume discount price level and equipment demand level into a proposed equipment acquisition contract, and providing the contract to the customer;

(h) receiving an executed contingent equipment acquisition contract from the customer, prior to the expenditure of funds to purchase equipment and pay for a site visit by an energy consultant, which contract becomes binding only if an aggregate number of a plurality of customers executing acquisition contracts reaches a threshold level equal to or greater than the equipment demand level associated with the volume discount price level, and which contract remains non-binding if said aggregate number does not reach said threshold level;

(i) aggregating the contracts executed by the plurality of customers to calculate an aggregate equipment demand level;

(j) notifying the customer when the aggregate equipment demand level reaches a level equal to or greater than the equipment demand level associated with the volume discount price level;

(k) facilitating acquisition of the equipment from at least one equipment supplier; and (l) facilitating installation of the equipment at a customer location.

7. The system of claim 6, in which the site resource data comprise data on customer geographic location, orientation of structures, access to an electric power grid, availability of sunlight, availability of space for photovoltaic cells, availability of wind, availability of space for wind turbines, availability of hydrogen-based fuels, availability of space for fuel cells, applicable utility tariffs and applicable governmental regulations.

8. The system of claim 6, in which the energy generation equipment is based on at least one of the following technologies: photovoltaic, wind turbine, fuel cell, batteries, geothermal, passive solar, biomass, microturbines and micro-hydro systems.

9. The system of claim 6, in which the means to facilitate purchase and installation of the equipment includes means for automating the process of matching each customer with at least one of a trained specifier, a trained installer, or a trained electrician.

10. The system of claim 6 wherein the system is further configured to automatically send invitations to customers to join organizations.

\* \* \* \* \*